Figure 1:
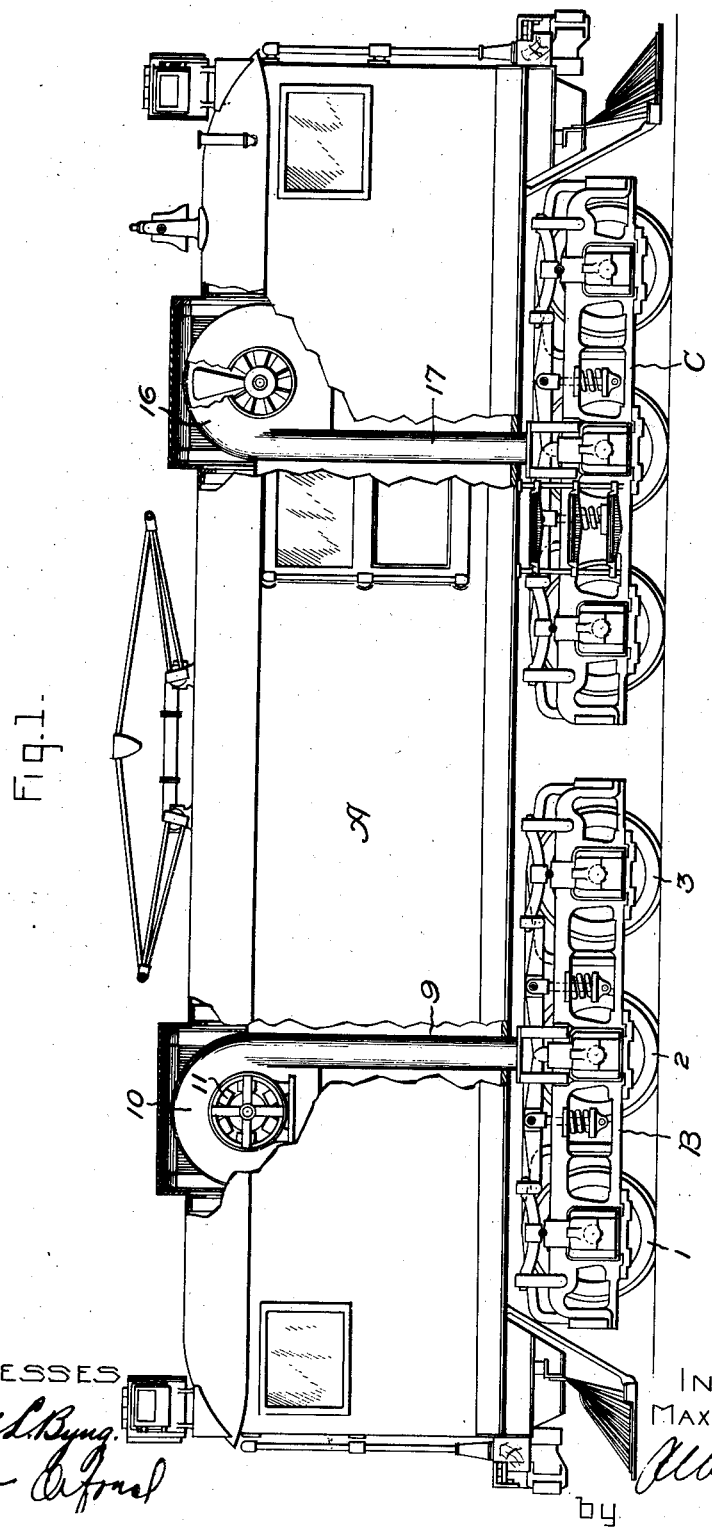

M. R. HANNA.
ELECTRIC LOCOMOTIVE.
APPLICATION FILED SEPT. 11, 1906.

929,587.

Patented July 27, 1909.
2 SHEETS—SHEET 1.

WITNESSES

INVENTOR
Max R. Hanna.
by
Atty

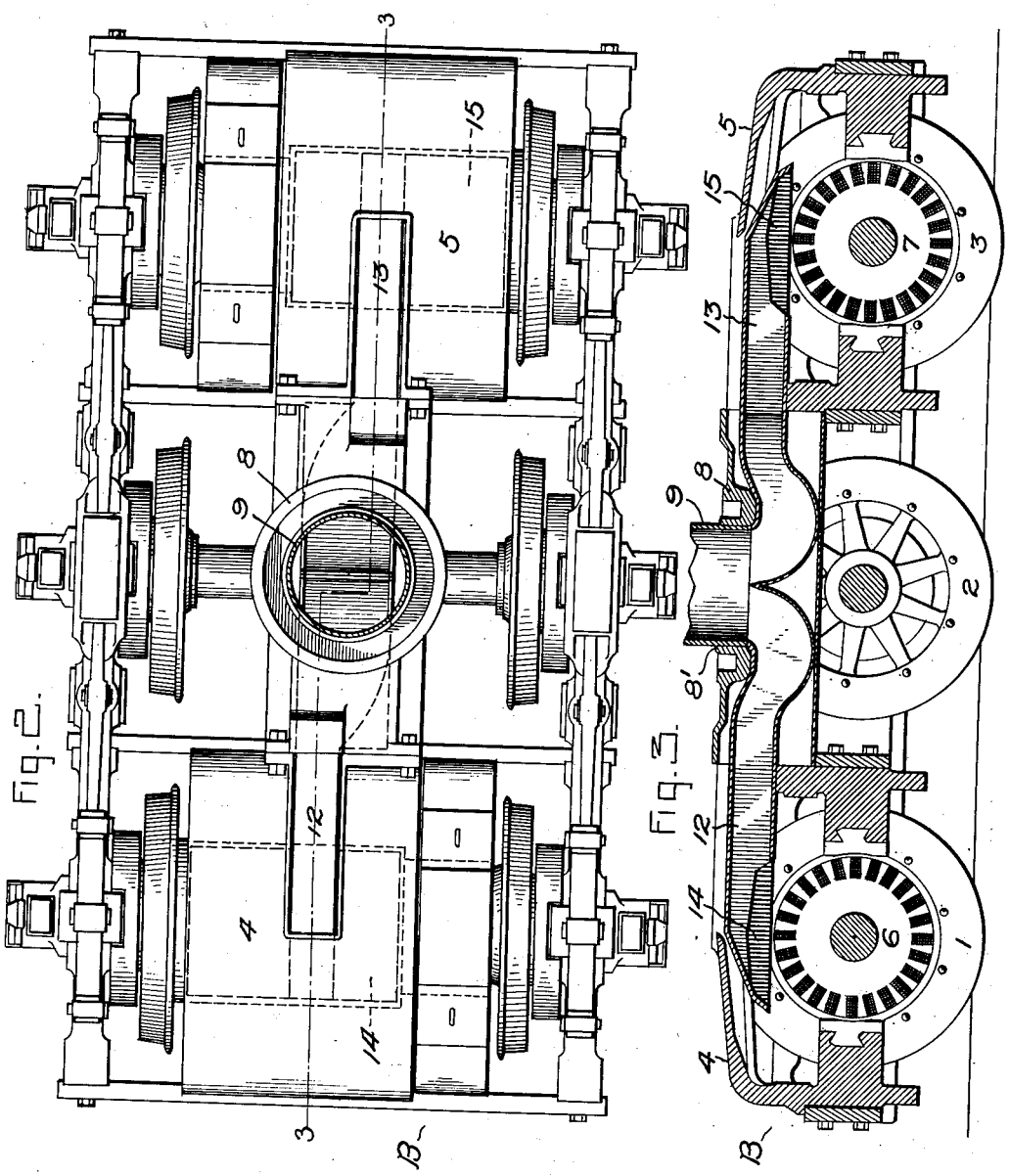

UNITED STATES PATENT OFFICE.

MAX R. HANNA, OF SCHENECTADY, NEW YORK, ASSIGNOR TO GENERAL ELECTRIC COMPANY, A CORPORATION OF NEW YORK.

ELECTRIC LOCOMOTIVE.

No. 929,587.            Specification of Letters Patent.          Patented July 27, 1909.

Application filed September 11, 1906. Serial No. 334,183.

*To all whom it may concern:*

Be it known that I, MAX R. HANNA, a citizen of the United States, residing at Schenectady, county of Schenectady, State of New York, have invented certain new and useful Improvements in Electric Locomotives, of which the following is a specification.

In self-propelled electric vehicles, particularly cars and locomotives, the space which may be allotted to the propelling motors, where the motors are arranged within the trucks beneath the main vehicle body is so restricted that, in order to secure great power for high speed or heavy traction work, they must be designed to operate much more nearly at their ultimate capacity than is ordinarily the case in other situations. One of the results of these conditions is that the motors are apt to become hot, lowering their efficiency and also endangering the insulation. If means for dissipating the heat generated by such motors so as to maintain them relatively cool can be provided, much better results, both as to efficiency of operation and maintenance may be secured.

The present invention has for its object to provide means for effectively cooling such motors without introducing complications which are in themselves objectionable.

To the above end my invention comprises a novel construction and arrangement of parts to be hereinafter particularly pointed out in the claims.

For a better understanding of my invention and of its objects and advantages reference may be had to the following detailed description taken in connection with the accompanying drawings which illustrate a preferred embodiment of my invention.

In said drawings, Figure 1 shows in side elevation a two-truck electric car or locomotive provided with blowers for forcing currents of cooling air past the motors, portions of the cab being broken away so as to more clearly show the blowers and the conduits leading therefrom to the trucks on which the motors are mounted; Fig. 2 is a view of one of the trucks shown in Fig. 1; and Fig. 3 is a section taken on line 3—3 of Fig. 2.

The car or locomotive illustrated has one or more swiveled trucks and it is to this type of vehicle that my invention is particularly applicable, although certain features of the invention may be used to advantage in other situations.

In the drawings, A indicates the car or locomotive body or cab, and B and C indicate trucks, either or both of which may be swiveled.

Referring to truck B, which may be similar to the other truck or not, as it may be desired, 1, 2 and 3 indicate sets of wheels, two of which, 1 and 3, are drivers. The motors are illustrated as being of the bi-polar gearless type, wherein the field magnets 4 and 5 are built into the truck frames and the armatures 6 and 7 are mounted directly upon the driving axles. The truck is provided with any usual or preferred form of center bearing 8 upon which one end of the vehicle body is adapted to rest so as to permit the truck to oscillate about the center of the bearing and at the same time be held against bodily movement laterally or longitudinally. This bearing is provided with an opening 8', preferably circular in cross-section, and having its center at the axis about which the truck is free to swing. A tube 9 extends from the vehicle body down into this opening. The tube may be fixed to the car body and journaled within the opening 8' so that as the truck oscillates with respect to the car body it likewise oscillates with respect to the tube. This tube forms the discharge conduit from a blower 10 which may conveniently be placed in the top of the cab and driven by a small motor 11 or in any other desired manner. A pair of conduits 12 and 13 extend from a point adjacent the lower end of the tube 9 to points adjacent the armatures 6 and 7, respectively. These conduits, it will be seen, form part of the truck structure, as it were, and follow the movements of the truck. Thus, there is provided a connection between the blower and each motor which consists of a conduit fixed to and movable with the vehicle body and a second conduit fixed to and movable with the truck; all flexible connections being avoided. The conduits 12 and 13 are shown as being square in cross-section at the points where they leave the center bearing and pass through the yokes of the field magnets and as having their outer ends expanded at 14 and 15, respectively, in order to distribute the air across the entire upper surfaces of the armature. It will be seen that by placing the adjacent ends of the conduits 12 and 13 within the hollow body of the center bearing and the outer ends within the field magnet frames, they are situated so as to discharge the cooling air in the most advantageous manner, and at the same time are effectively housed and protected without taking up space which would otherwise be available for other purposes.

If the truck C is also a motor truck, a second blower 16 may conveniently be placed at the end of the cab adjacent that truck to supply a cooling medium to the motors at that end of the vehicle through a conduit 17 corresponding to the tube 9. It is, however, not essential that separate blowers be used as this is a matter which depends upon the particular conditions in any given case.

It will be obvious that my invention is susceptible of modification in many ways, since in its broader aspects it contemplates the use of any conduit for carrying a cooling medium, the conduit extending from the vehicle body to the motor or motors on the truck and including a portion passing through the pivot of the truck. The particular arrangement illustrated is, however, simple and compact and one which may be used advantageously with the truck shown.

What I claim as new, and desire to secure by Letters Patent of the United States, is,—

1. In an electric vehicle, a motor-truck having a bearing, a vehicle body carried upon said bearing, a conduit extending from the truck motor through said bearing, and means carried by the vehicle body for causing a circulation of cooling fluid through said conduit.

2. In an electric vehicle, a motor-truck swiveled beneath the vehicle body, a conduit extending from the truck-motor through the pivot of the truck, and means for creating a circulation of cooling fluid through said conduit.

3. In an electric vehicle, a motor-truck swiveled beneath the vehicle body, a conduit extending from the truck-motor through the pivot of the truck and to the vehicle body, and means carried upon the vehicle for creating a circulation of cooling fluid through said conduit and past the truck motor.

4. In an electric vehicle, a truck having a propelling motor, a bearing on said truck, a cab seated on said bearing, a source of air under pressure in said cab, and a conduit for conveying air from said source to the said motor, said conduit passing through the bearing between the truck and the cab.

5. In an electric vehicle, a truck having a propelling motor, a bearing on said truck, a cab supported upon said bearing, a blower mounted in said cab, and a conduit for conveying air from said blower to a point adjacent the said propelling motor to cool the same, said conduit passing through the said bearing between the truck and the cab.

6. In an electric vehicle, a truck swiveled beneath the vehicle body, a motor on said truck, a conduit passing from a point adjacent the said motor and through the truck pivot, and means for forcing air through said conduit to cool the motor.

7. In an electric locomotive, a truck swiveled beneath the locomotive body, a motor on said truck, a conduit leading from said motor and through the pivot of the truck to the locomotive body, and means carried by the locomotive for causing air to flow through said conduit to the motor for cooling the same.

8. In an electric locomotive, a truck swiveled beneath the locomotive body, a motor on said truck, a blower carried by the locomotive body, and a conduit extending from said blower through the pivot of the truck to a point adjacent said motor for conveying a stream of cooling air from the blower to the motor.

9. In an electric locomotive, a truck swiveled beneath the locomotive cab, a propelling motor on said truck, a blower mounted in said cab, and a conduit extending from said blower through the pivot of the truck to a point adjacent the said motor for conveying from the blower to the motor a stream of cooling fluid.

10. In an electric locomotive, a truck, a hollow center bearing on said truck, a propelling motor on said truck, a conduit leading from said hollow center bearing to the motor, a blower carried by the locomotive body, and a conduit connecting the discharge end of the blower to said hollow center bearing.

11. In an electric vehicle, a truck, a motor having an armature mounted upon one of the truck axles, a hollow center bearing on said truck, a tube leading from said center bearing to a point adjacent the said armature, and a blower carried by the vehicle and connected to said hollow center bearing for forcing a stream of cooling air across said armature.

12. In an electric vehicle, a truck, a hollow center bearing on said truck, propelling motors on opposite sides of said center bearing, conduits leading from said center bearing to each of said motors, and means carried by the vehicle and connected to the said center bearing for creating a circulation of cooling fluid through the center bearing and conduits past the said motors.

13. In an electric locomotive, a truck, a hollow center bearing on said truck, a pair of propelling motors on said truck on opposite sides of said bearing, conduits leading from the interior of said bearing to the motors, a blower carried by the locomotive, and a pipe connecting the blower to the interior of the center bearing.

14. In an electric locomotive, a locomotive body, a plurality of swiveled trucks under said body, propelling motors on certain of said trucks, a plurality of blowers, and a conduit passing from each of said blowers through the pivot of one of said trucks and to the motor or motors of that truck.

15. In a system of ventilation for electric railway-motors, the combination of a truck provided with one or more motors and having swivel connection with the car, said swivel connection having an air-passage through the same; means for delivering a current of air into the upper end of said air-passage; and means for conducting the current of air from the lower end of the air-passage to the motor or motors.

16. In a system of ventilation for electric railway-motors, the combination of a truck having one or more motors and having a swivel connection with the car, said swivel connection having an air-passage through the same; a blower; an air-conduit conducting air from the blower to the upper end of the said air-passage; and one or more pipes connecting the lower end of said air-passage with the motor or motors.

In witness whereof, I have hereunto set my hand this 10th day of September, 1906.

MAX R. HANNA.

Witnesses:
BENJAMIN B. HULL,
HELEN ORFORD.